(12) United States Patent
Lin et al.

(10) Patent No.: US 11,314,113 B1
(45) Date of Patent: Apr. 26, 2022

(54) DISPLAY DEVICE

(71) Applicant: QISDA CORPORATION, Taoyuan (TW)

(72) Inventors: Jun-Da Lin, New Taipei (TW); Chun-Ting Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/200,897

(22) Filed: Mar. 14, 2021

(30) Foreign Application Priority Data

Oct. 27, 2020 (TW) .................................. 109137182

(51) Int. Cl.
*G02F 1/1333* (2006.01)

(52) U.S. Cl.
CPC .. *G02F 1/133314* (2021.01); *G02F 1/133328* (2021.01); *G02F 2201/46* (2013.01)

(58) Field of Classification Search
None
See application file for complete search history.

(56) References Cited

FOREIGN PATENT DOCUMENTS

TW 201430284 A 8/2014

*Primary Examiner* — Richard H Kim (57) ABSTRACT

A display device includes a plate member, an outer frame, and a display panel. The plate member has a fringe portion and a joining structure formed on the fringe portion. The fringe portion has an edge and two opposite surfaces. The outer frame has a parallel frame portion and a non-parallel frame portion extending from the parallel frame portion. The parallel frame portion is parallel to the fringe portion and is embedded into the joining structure, so as to make the outer frame and the plate member jointly from an accommodating space for accommodating the display panel. The parallel frame portion is coplanar with one of the surfaces. Therein, the joining structure can include an opening structure passing through the two surfaces and extending to the edge. Or, the joining structure can include an opening structure, passing through the two surfaces, and a raised portion.

26 Claims, 12 Drawing Sheets

DISPLAY DEVICE

BACKGROUND OF THE INVENTION

1. Field of the Invention

The present invention relates to a display device, and more particularly to a light and thin display device.

2. Description of the Prior Art

In order to meet user requirements for the image quality and appearance of display devices, narrow rim has gradually become the development trend of display devices. In order to achieve the purpose of narrow rim, some prior arts use the front frame of the panel module as an appearance part, and join the back plate and plastic frame of the panel module together. In general, the side edges of the back plate needs to be bent to a certain thickness to enclose the plastic frame so that the back plate and the plastic frame can be tightly joined. However, this junction of the back plate and the plastic frame will increase the width of the rim, which is not conducive to the light and thin design of the display device.

SUMMARY OF THE INVENTION

An objective of the invention is to provide a display device. A joining structure between a plate member and an outer frame of the display device can provide sufficient joining strength and is conducive to a light and thin design, which can solve the above problem.

According to an embodiment of the invention, a display device includes a plate member, an outer frame, and a display panel. The plate member has a fringe portion and a joining structure formed on the fringe portion. The fringe portion has an edge, a first surface, and a second surface opposite to the first surface. The joining structure includes an opening structure passing through the first surface and the second surface. The opening structure extends to the edge. The outer frame has a parallel frame portion and a non-parallel frame portion extending from the parallel frame portion. The parallel frame portion and the fringe portion are joined together so that the outer frame and the plate member form an accommodating space. The parallel frame portion is parallel the fringe portion and is embedded into the joining structure. The non-parallel frame portion is non-parallel to the fringe portion. The parallel frame portion is coplanar with the first surface or the second surface. The display panel is accommodated in the accommodating space.

According to another embodiment of the invention, a display device includes a plate member, an outer frame, and a display panel. The plate member has a fringe portion and a joining structure formed on the fringe portion. The fringe portion has an edge, a first surface, and a second surface opposite to the first surface. The joining structure includes an opening structure and a raised portion. The opening structure passes through the first surface and the second surface. An orthographic projection of the raised portion on the first surface is located within an orthographic projection of the joining structure on the first surface. The outer frame has a parallel frame portion and a non-parallel frame portion extending from the parallel frame portion. The parallel frame portion and the fringe portion are joined together so that the outer frame and the plate member form an accommodating space. The parallel frame portion is parallel the fringe portion and is embedded into the joining structure. The non-parallel frame portion is non-parallel to the fringe portion. The parallel frame portion is coplanar with the first surface or the second surface. The display panel is accommodated in the accommodating space.

Compared with the prior art, in the display devices according to the invention, the parallel frame portion of the outer frame can be effectively joined without encapsulating the fringe portion of the plate member, so the overall structure thickness of the junction can be reduced, which is conducive to the light and thin design and solves the problem in the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
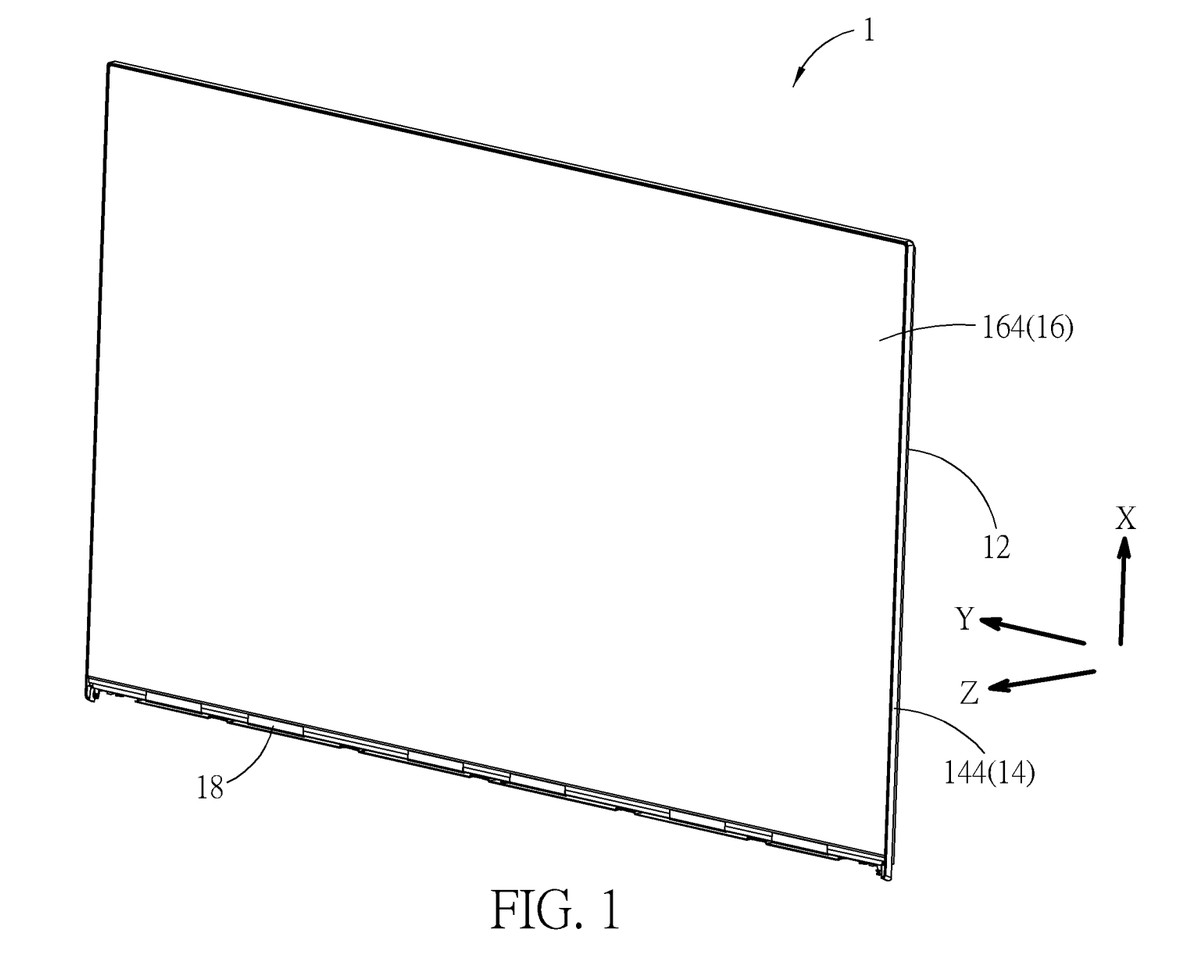
FIG. 1 is a schematic diagram illustrating a display device according to an embodiment.
Figure 2:
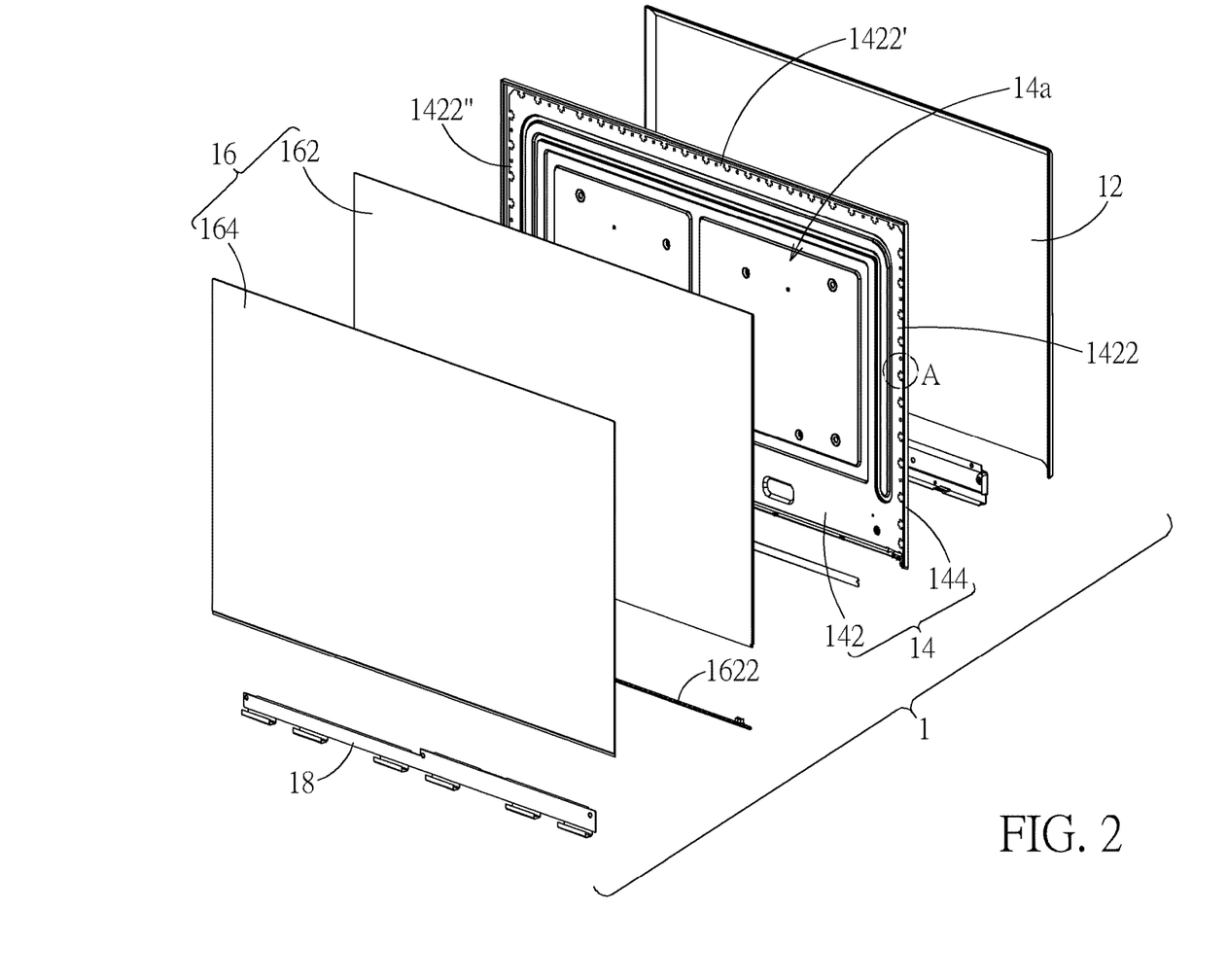
FIG. 2 is a partially exploded view of the display device in FIG. 1.
Figure 3:
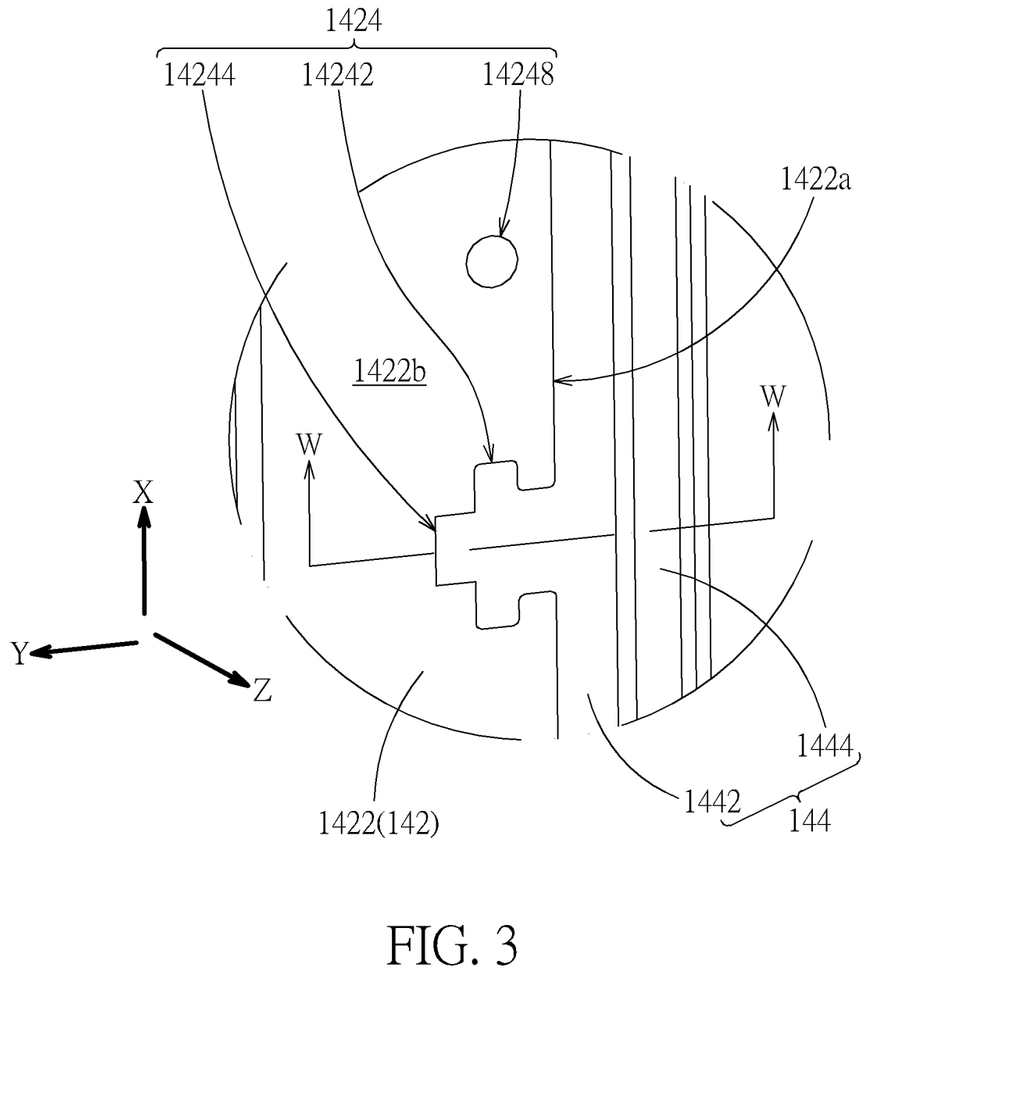
FIG. 3 is an enlarged view of a frame assembly at the circle A in FIG. 2.
Figure 4:
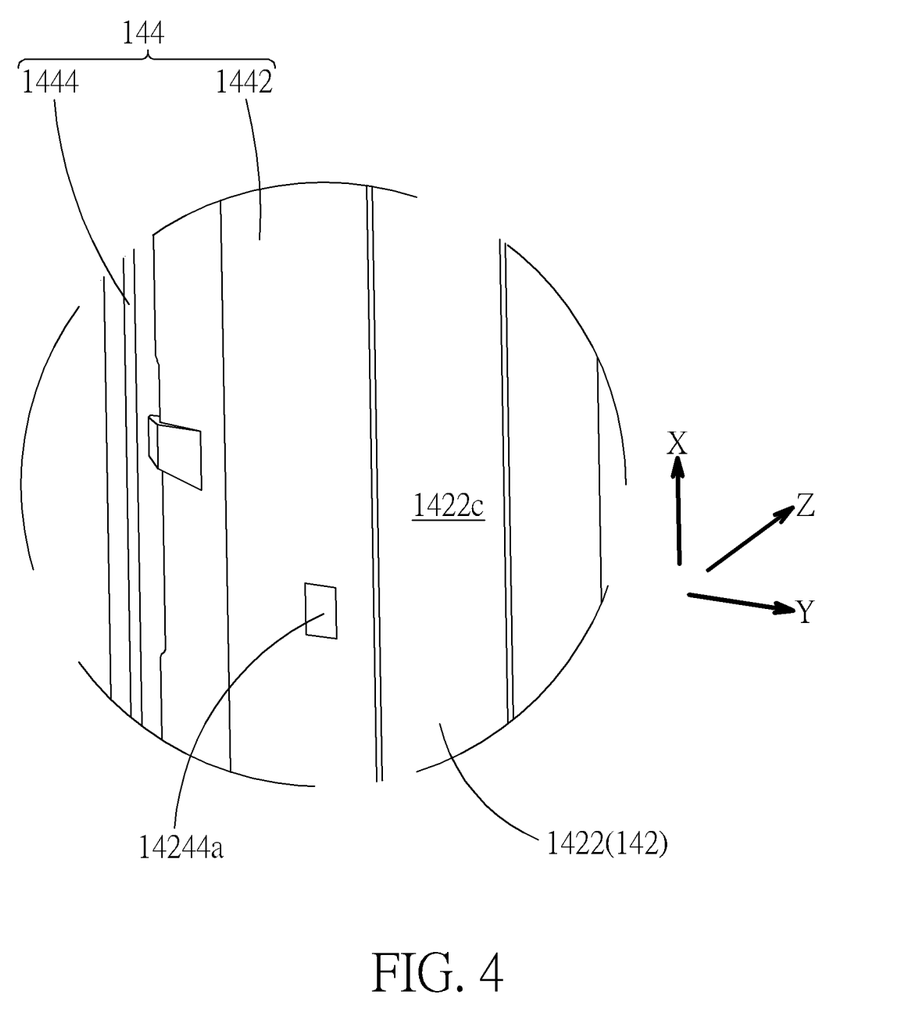
FIG. 4 is an enlarged view of the back side of the frame assembly corresponding to the circle A in FIG. 2.

Please refer to FIG. 1 and FIG. 2. A display device 1 according to an embodiment has a displaying direction (equal to the Z-axis direction in FIG. 1) and includes an outer casing 12, a frame assembly 14, a display panel 16, and a control module 18. The frame assembly 14 has an accommodating space 14a with an opening facing forward. The display panel 16 (for example, including a backlight module 162 and a liquid-crystal panel 164) is accommodated in the accommodating space 14a. The control module 18 is fixed to the back side of the frame assembly 14 and is electrically connected to the display panel 16 for controlling the operation of the display panel 16. The outer casing 12 is assembled to the frame assembly 14 from the rear of the frame assembly 14 and covers the control module 18.

Please also refer to FIG. 3 to FIG. 8. The frame assembly 14 includes a plate member 142 and an outer frame 144. The plate member 142 and the outer frame 144 are embedded with each other to form an accommodating space 14a. The outer casing 12 and the display panel 16 are located at two opposite sides of the plate member 142. Therein, the plate member 142 has a fringe portion 1422 and a joining structure 1424 formed on the fringe portion 1422. The fringe portion 1422 has an edge 1422a, a first surface 1422b, and a second surface 1422c opposite to the first surface 1422b. The first surface 1422b is exposed in the accommodating space 14a. The joining structure 1424 includes a plurality of opening structures 14242 and a plurality of raised portions 14244. The opening structure 14242 passes through the first surface 1422b and the second surface 1422c and extends to the edge 1422a. The raised portion 14244 protrudes from the second surface 1422c and is located at a side of the opening structure 14242. Overall, the plurality of raised portions 14244 are arranged parallel to the edge 1422a.

The outer frame 144 has a parallel frame portion 1442 and a non-parallel frame portion 1444 extending from the parallel frame portion 1442. The parallel frame portion 1442 and the fringe portion 1422 are joined together so as to make the outer frame 144 and the plate member 142 form the accommodating space 14a. The parallel frame portion 1442 extends parallel to the fringe portion 1422 and is embedded into the joining structure 1424, which can be achieved by insertion molding in practice. For example, the plate member 142 is made of a metal plate (for example by stamping), and the outer frame 144 is formed by plastic injection. The non-parallel frame portion 1444 and the fringe portion 1422 are non-parallel. In the embodiment, the overall plate member 142 extends parallel a reference plane P1 (which is perpendicular to the displaying direction, i.e. the Z-axis direction, and indicated by chain lines in FIG. 5 and FIG. 8). The first surface 1422b and the second surface 1422c are parallel to the reference plane P1. The parallel frame portion 1442 also extends parallel to the reference plane P1 while the non-parallel frame portion 1444 extends perpendicular to the fringe portion 1422 (or the reference plane P1); however, it is not limited thereto in practice. For example, the non-parallel frame portion 1444 is disposed obliquely to the fringe portion 1422 (i.e. not perpendicular to the reference plane P1).

Furthermore, in the embodiment, the raised portion 14244 protrudes from the second surface 1422c. The parallel frame portion 1442 is coplanar with the first surface 1422b and is coplanar with the top surface 14244a of the raised portion 14244. The combined thickness of the parallel frame portion 1442 and the fringe portion 1422 is equal to the thickness of the parallel frame portion 1442 (in the Z-axis direction perpendicular to the reference plane P1; therein, the Z-axis direction is indicated by an arrow in the figures), and is also equal to the entire thickness of the fringe portion 1422 and the joining structure 1424. This structural feature can prevent the frame assembly 14 from being too thick at the junction of the parallel frame portion 1442 and the fringe portion 1422, which is not conducive to the light and thin design. In other words, the parallel frame portion 1442 is only attached to the second surface 1422c and embedded into the joining structure 1424, instead of encapsulating the fringe portion 1422 (i.e. attached to the first surface 1422b and the second surface 1422c at the same time) to achieve the junction of the outer frame 144 and the plate member 142. Furthermore, in the accommodating space 14a, the parallel frame portion 1442 is coplanar with the first surface 1422b, which can reduce structural interference with components accommodated in the accommodating space 14a, and increase the utilization of the accommodating space 14a.

Figure 5:
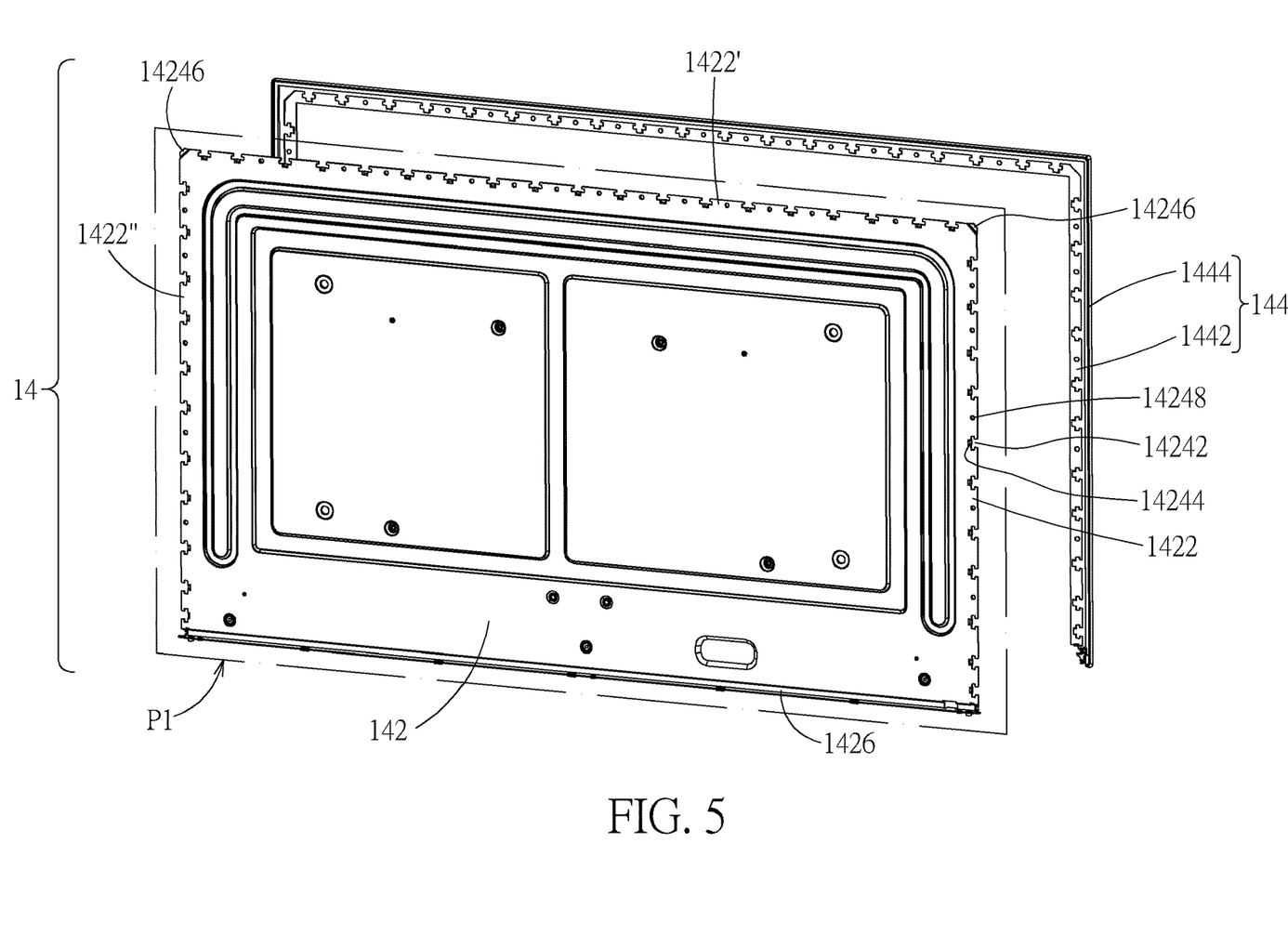
FIG. 5 is an exploded view of the frame assembly in FIG. 2.

In the embodiment, as shown by FIG. 2 and FIG. 5, the joining structure 1424 also includes two raised portions 14246 that protrude from the second surface 1422c and are located at corners of the plate member 142. The outer frame 144 and the raised portion 14246 are embedded with each other; therein, the parallel frame portion 1442 is also coplanar with the top surface of the raised portion 14246. Furthermore, please also refer to FIG. 6 and FIG. 7. The joining structure 1424 also includes a plurality of through holes 14248 passing through the first surface 1422b and the second surface 1422c. The through hole 14248 is located between two adjacent opening structures 14242. In the embodiment, every two opening structures 14242 is spaced by one through hole 14248; however, it is not limited thereto in practice.

Furthermore, in the embodiment, the overall outer frame 144 is an n-shaped structure. The outer frame 144 is joined with three sides of the plate member 142 (including the fringe portion 1422 and other two fringe portions 1422' and 1422"). Therein, the junction of the outer frame 144 with the fringe portions 1422' and 1422" is the same as the junction of the outer frame 144 with the fringe portion 1422, and will not be described in addition. However, it is not limited thereto in practice. The plate member 142 forms an accommodating slot 1426 at the opening of the n-shaped structure. The backlight module 162 includes a light bar 1622 disposed in the accommodating slot 1426 for providing required light. In addition, in practice, the bottom of the display device 1 can be connected to other structures (such as a support base). In practice, according to an actual product design of display device 1, the outer frame 144 can also be designed as a rectangular structure and joined with the periphery of the plate member 142.

Figure 9:
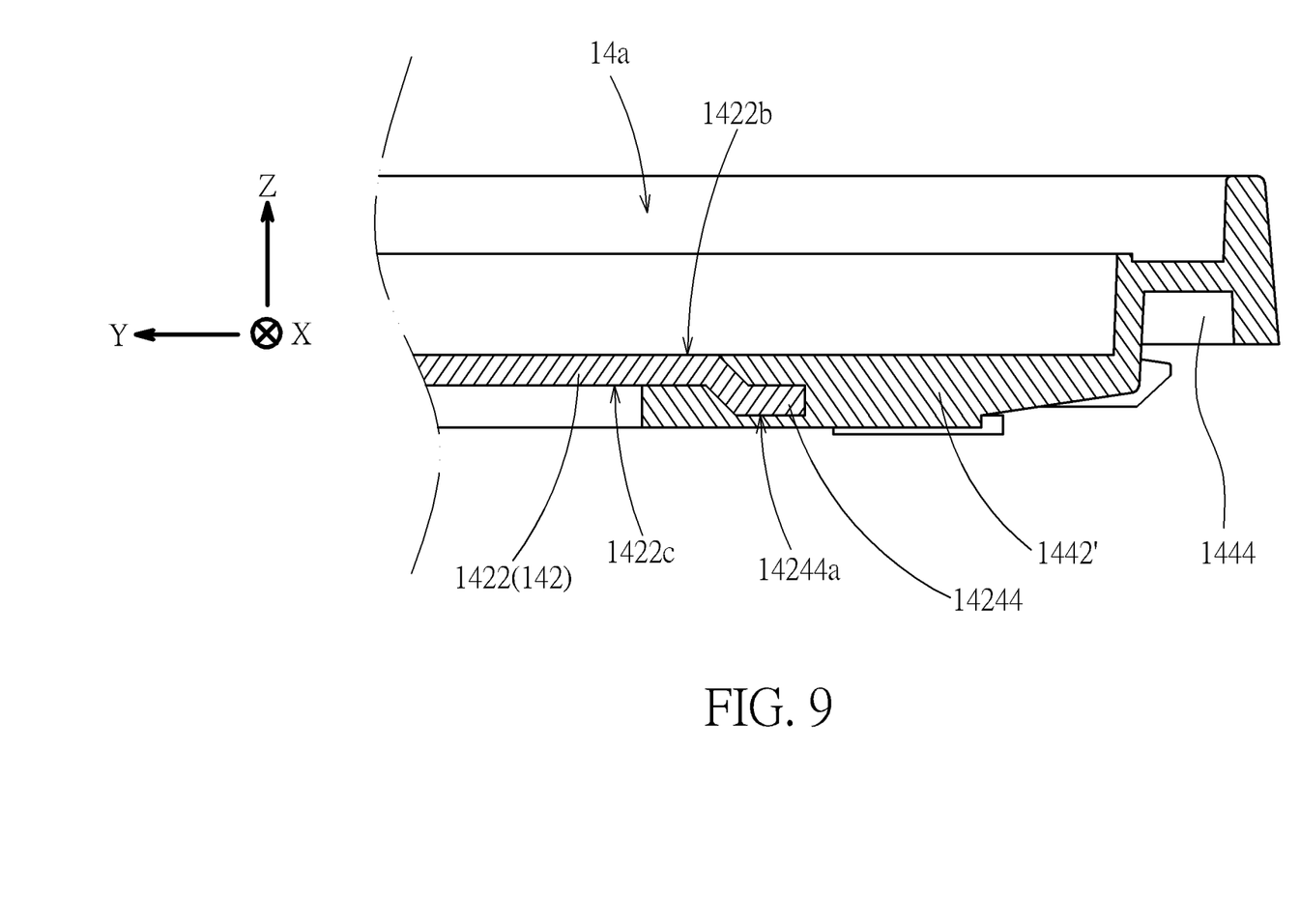
FIG. 9 is a sectional view of a frame assembly according to another embodiment; therein, the position of the cutting plane is equivalent to the line W-W in FIG. 3.
Figure 10:
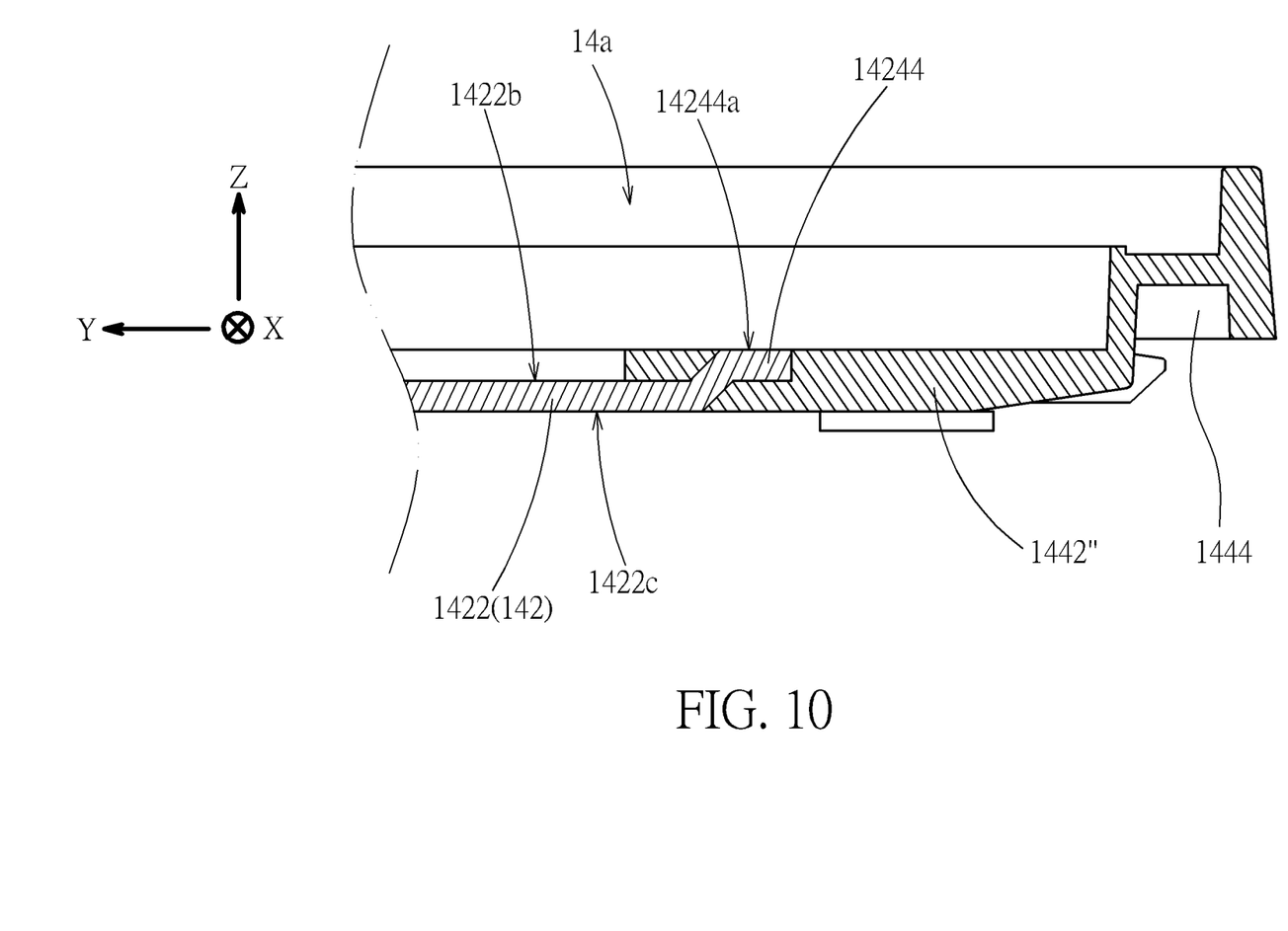
FIG. 10 is a sectional view of a frame assembly according to another embodiment; therein, the position of the cutting plane is equivalent to the line W-W in FIG. 3.

As described above, both the opening structure 14242 and the raised portion 14244 of the joining structure 1424 have the effect of restraining the fringe portion 1422, and can be implemented alternatively in practice. In addition, in the embodiment, the parallel frame portion 1442 is only attached to the second surface 1422c and embedded into the joining structure 1424, which can make the junction of the outer frame 144 and the plate member 142 have a certain joining strength. In practice, the parallel frame portion 1442 also can be joined with the fringe portion 1422 of the plate member 142 in other ways. For example, in an embodiment, the parallel frame portion 1442' also covers the top surface 14244a of the raised portion 14244, as shown by FIG. 9, which can increase the joining strength of the outer frame 144 and the plate member 142. For another example, in an embodiment, the raised portion 14244 protrudes from the first surface 1422b, and the parallel frame portion 1442" is coplanar with the second surface 1422c and is also coplanar with the top surface 14244a of the raised portion 14244, as shown by FIG. 10. This structural configuration also can make the junction of the outer frame 144 and the plate member 142 effectively joined.

Figure 6:
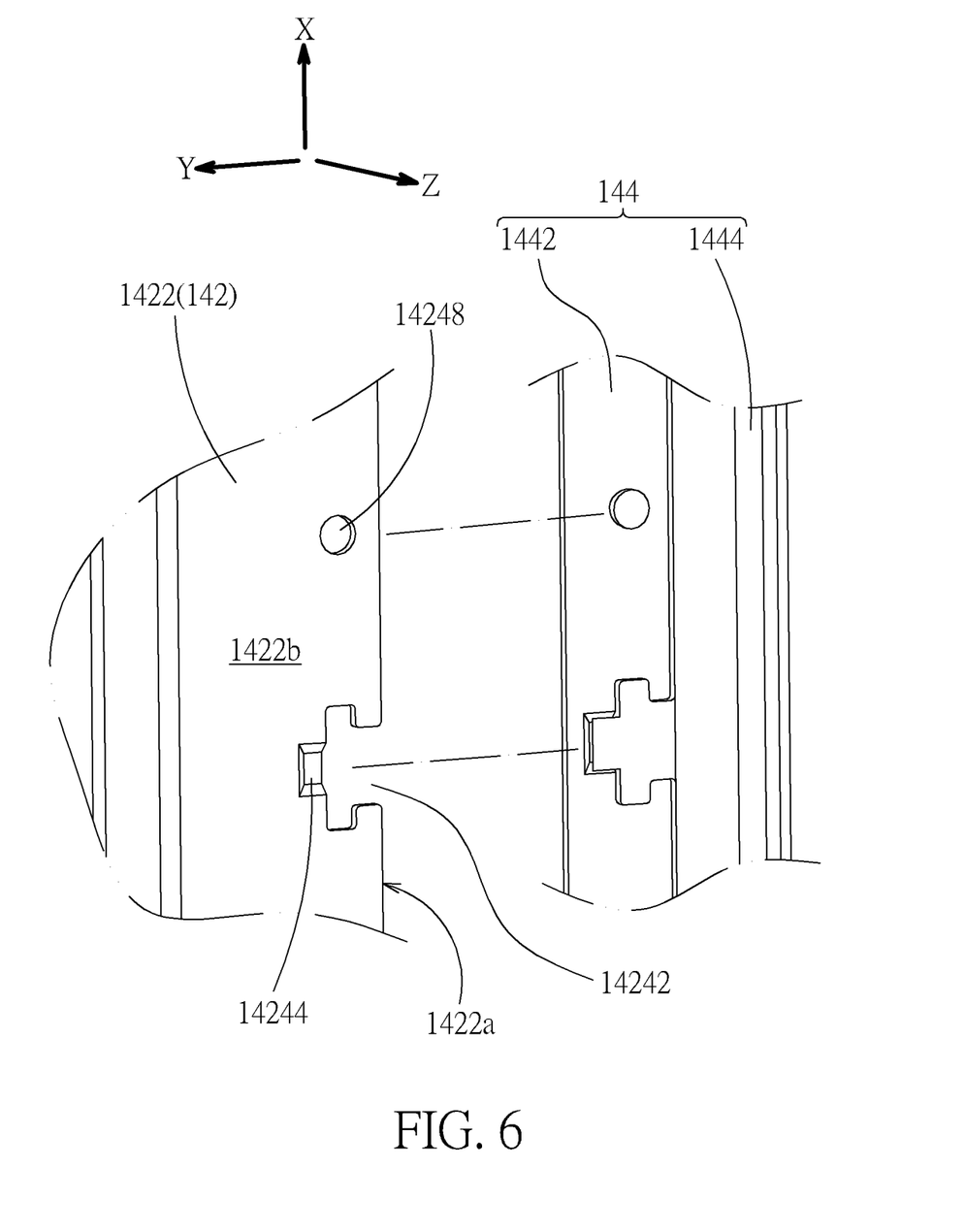
FIG. 6 is an exploded view of the frame assembly in FIG. 3.

Furthermore, in the embodiment, as shown by FIG. 2 and FIG. 6, the opening structure 14242 is a through slot structure with a T-shaped extension path, of which one end extends to the edge 1422a. This extension path has components in both the X-axis direction (parallel to the edge 1422a) and the Y-axis direction (perpendicular to the edge 1422a), so the opening structure 14242 itself can produce a two-dimensional (or so-called planar) structural constraint on the parallel frame portion 1442. Therein, the X-axis direction and the Y-axis direction are indicated by an arrow respectively in the figures. In practice, the opening structure 14242 also can extend in other extension paths, such as an L-shaped path, an arc-shaped path and so on, which can have components in both the X-axis direction and the Y-axis direction. Furthermore, in practice, the plurality of opening structures 14242 also can extend in a plurality of extension paths. For example, one of the opening structures 14242 extends in a straight line, and another one of the opening structures 14242 extends in another straight line. The two straight lines are not parallel to each other. The two opening structures 14242 also can jointly produce a two-dimensional (or so-called planar) structural constraint on the parallel frame portion 1442. Furthermore, in practice, the extension path of the opening structure 14242 is not limited to extending to the edge 1422a. Furthermore, in practice, the opening structure 14242 can also be achieved by openings with other profiles, such as a polygonal through hole. In addition, in the embodiment, the parallel frame portion 1442 is embedded in the inner side the raised portion 14244 in the positive Z-axis direction, and covers a part of the second surface 1422c in the negative Z-axis direction, so the parallel frame portion 1442 and the edge portion 1422 also have the effect of structurally constraining each other in a direction parallel to the Z-axis direction.

Figure 7:
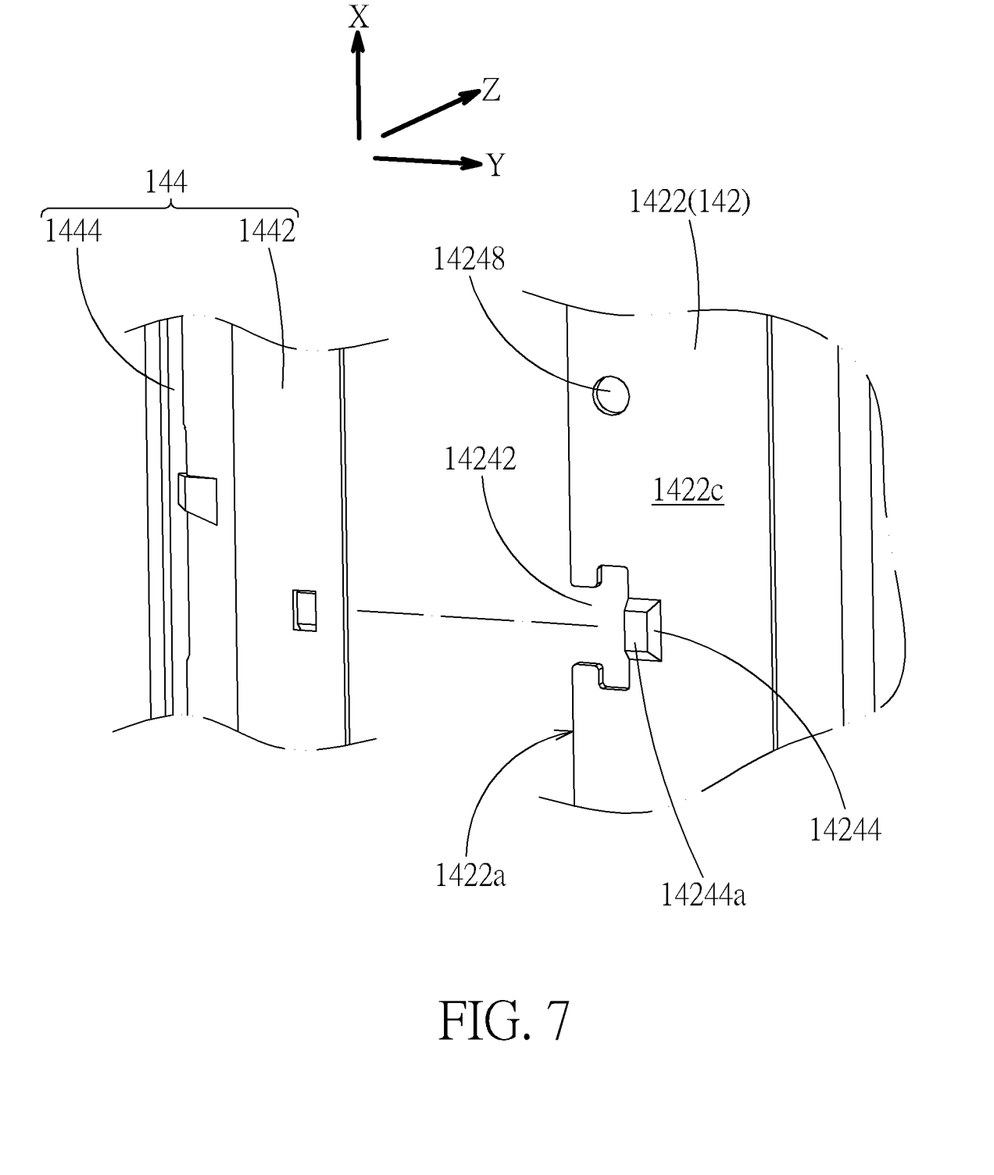
FIG. 7 is an exploded view of the frame assembly in FIG. 4.
Figure 8:
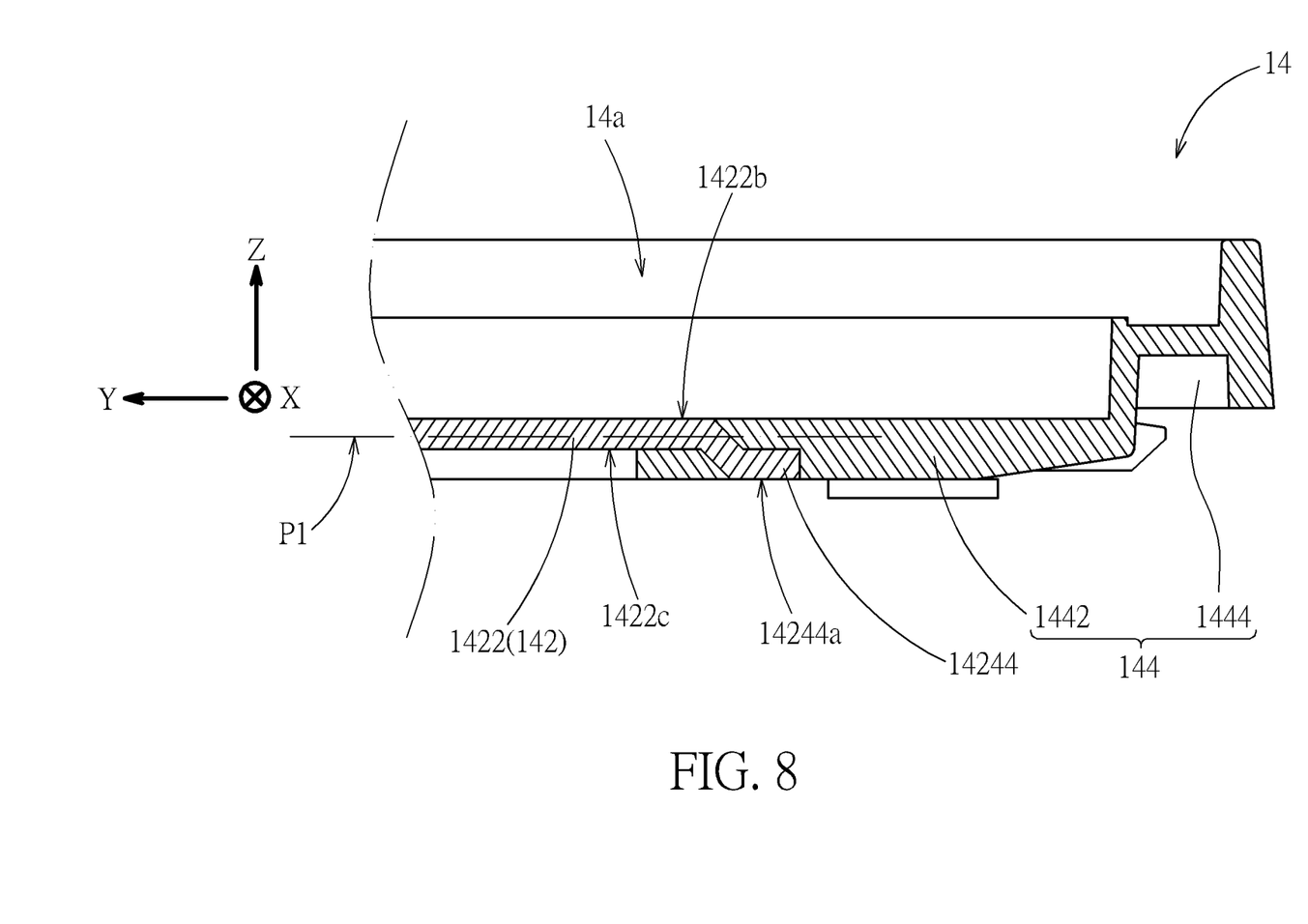
FIG. 8 is a sectional view of the frame assembly along the line W-W in FIG. 3.
Figure 11:
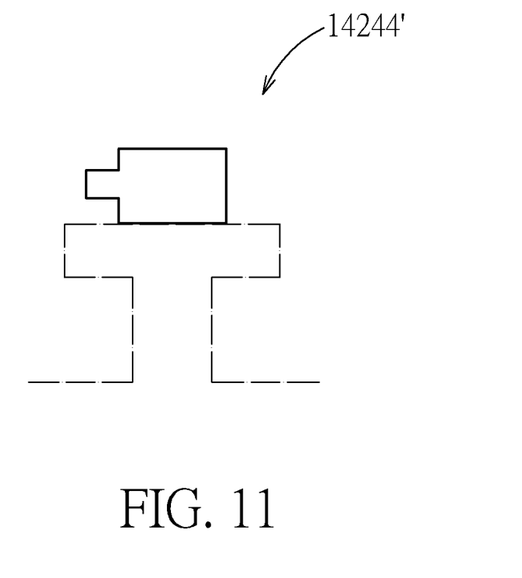
FIG. 11 is a schematic diagram illustrating the projection of a raised portion according to another embodiment.
Figure 12:
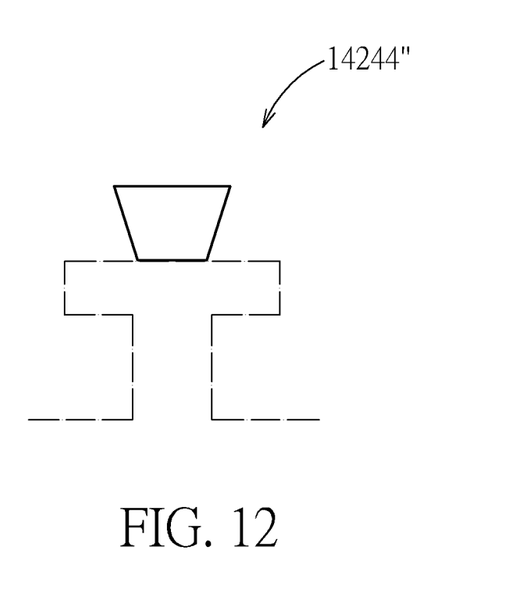
FIG. 12 is a schematic diagram illustrating the projection of a raised portion according to another embodiment.

Furthermore, in the embodiment, as shown by FIG. 6 and FIG. 7, the projection of the raised portion 14244 in the Z-axis direction (perpendicular to the first surface 1422b or the second surface 1422c) is slightly rectangular. In practice, the raised portion 14244 also can be formed in a structure of which the projection is other geometric profiles. For example, as shown by FIG. 11 (in which the projection of the opening structure is indicated by chain lines), the projection 14244' of the raised portion in an embodiment has a polygonal profile with a slightly raised portion. Logically, the polygonal profile can be regarded as including a rectangular main portion and a protruding portion protruding from one side of the rectangular main portion. For another example, as shown by FIG. 12 (in which the chain lines indicate the projection of the opening structure), the projection 14244" of the raised portion in an embodiment has a trapezoidal profile.

Figure 13:
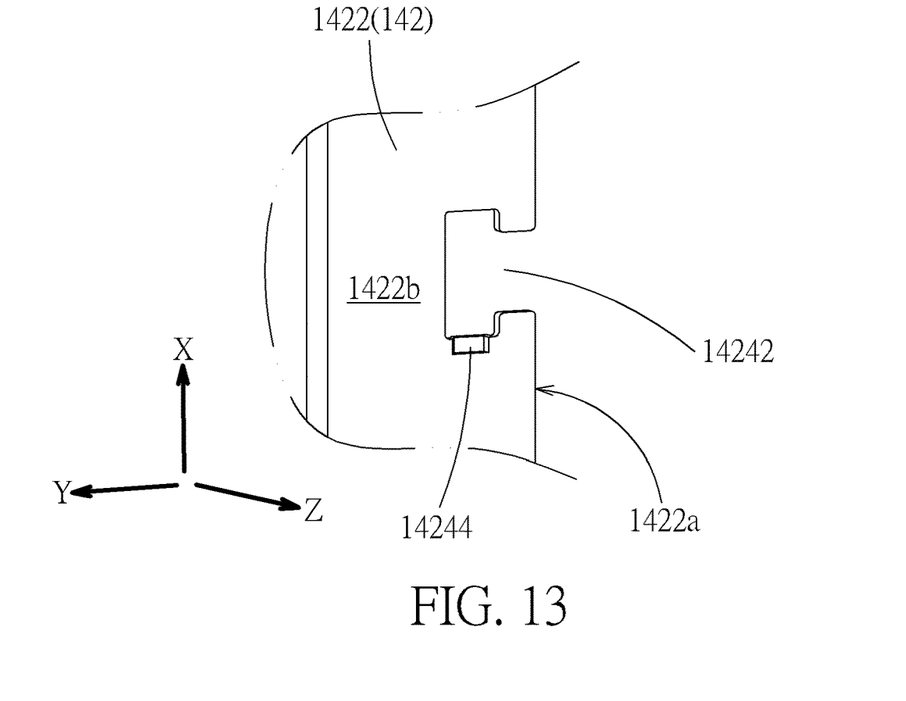
FIG. 13 is a schematic diagram illustrating the disposition of a raised portion according to another embodiment.
Figure 14:
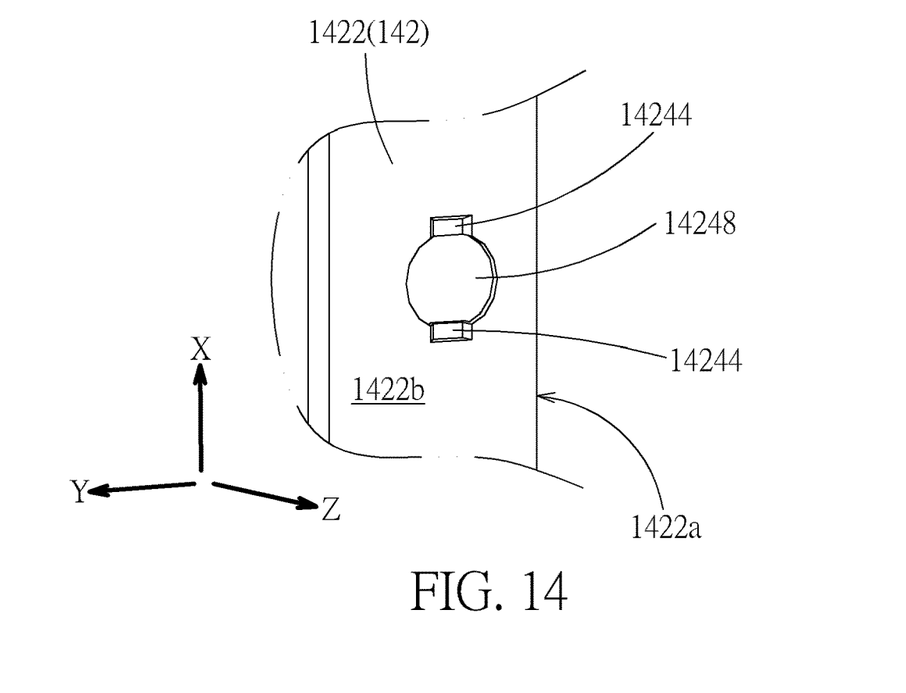
FIG. 14 is a schematic diagram illustrating the disposition of a raised portion according to another embodiment.

Furthermore, in the embodiment, as shown by FIG. 6 and FIG. 7, the raised portion 14244 is located at the side of the opening structure 14242 away from the edge 1422a (i.e. at the side of the transverse slot portion of the T-shaped slot structure; however, it is not limited thereto in practice. For example, the raised portion 14244 is changed to be disposed at other sides of the opening structure 14242 (for example, at one side of the longitudinal slot portion of the T-shaped slot structure). For another example, the raised portion 14244 is changed to be disposed at an end of the opening structure 14242, as shown by FIG. 13. For another example, the raised portion 14244 can be formed on the fringe portion 1422 independently of the opening structure 14242, for example, between two adjacent opening structures 14242, or at the edge 1422a. For another example, if the through hole 14248 permits in structure (for example, having a larger outline size), the raised portion 14244 can be formed at the hole edge of the through hole 14248, as shown by FIG. 14. Furthermore, in this example, there are a plurality of raised portions 14244 at the hole edge of the through hole 14248, and the raised portion 14244 are arranged parallel to the edge 1422a. In practice, the orthographic projection of the raised portion 14244 on the first surface 1422b is located within the orthographic projection of the joining structure 1424 on the first surface 1422b. In other words, the raised portion 14244 is located at an end or side of the opening structure 14242; the end or side of the opening structure 14242 forms the raised portion 14244. The raised portion 14244 cooperates with the opening structure 14242 so that the plate member 142 interferes with the outer frame 144 parallel to the first surface 1422b, which can make the plate member 142 and the outer frame 144 fit well with each other. Or, the raised portion 14244 is located at the hole edge of the through hole 14248; the hole edge of the through hole 14248 forms the raised portion 14244. The raised portion 14244 cooperates with the through hole 14248 so that the plate member 142 interferes with the outer frame 144 parallel to the first surface 1422b, which can make the plate member 142 and the outer frame 144 fit well with each other.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device, the display device having a displaying direction and comprising:
    a plate member, the overall plate member extending parallel to a reference plane, the plate member having a fringe portion and a joining structure formed on the fringe portion, the fringe portion having an edge, a first surface, and a second surface opposite to the first surface, the joining structure comprising an opening structure passing through the first surface and the second surface, the opening structure extending to the edge, the reference plane being perpendicular to the displaying direction, the first surface and the second surface being parallel to the reference plane;
    an outer frame, the outer frame having a parallel frame portion and a non-parallel frame portion extending from the parallel frame portion, the parallel frame portion and the fringe portion being joined together so that the outer frame and the plate member form an accommodating space, the parallel frame portion being parallel the fringe portion and being embedded into the joining structure, the non-parallel frame portion being non-parallel to the fringe portion, the parallel frame portion being coplanar with the first surface or the second surface; and
    a display panel, accommodated in the accommodating space.

2. The display device according to claim 1, wherein the non-parallel frame portion extends perpendicular to the fringe portion.

3. The display device according to claim 1, wherein the first surface is exposed in the accommodating space, and the parallel frame portion is coplanar with the first surface.

4. The display device according to claim 1, wherein the opening structure is formed by extending along a plane where the fringe portion is located.

5. The display device according to claim 1, wherein the joining structure comprises a raised portion.

6. The display device according to claim 5, wherein a projection of the raised portion in a direction perpendicular to the first surface or the second surface has a polygonal profile.

7. The display device according to claim 5, wherein the raised portion is located at an end or side of the opening structure.

8. The display device according to claim 5, wherein the first surface is exposed in the accommodating space, the parallel frame portion is coplanar with the first surface, and the raised portion protrudes from the second surface.

9. The display device according to claim 5, wherein the parallel frame portion is coplanar with a top surface of the raised portion.

10. The display device according to claim 5, wherein the parallel frame portion covers a top surface of the raised portion.

11. The display device according to claim 1, wherein the joining structure has a through hole and at least one raised portion, the through hole passes through the first surface and the second surface, and the at least one raised portion is located at a hole edge of the through hole.

12. The display device according to claim 1, wherein the outer frame is an n-shaped structure, the plate member forms an accommodating slot at an opening of the n-shaped structure, the display panel comprises a liquid-crystal panel and a backlight module, and the backlight module comprises a light bar, disposed in the accommodating slot.

13. The display device according to claim 1, further comprising an outer casing, connected to the outer frame and covering the plate member, wherein the outer casing and the display panel are located at two opposite sides of the plate member.

14. The display device according to claim 1, wherein an entire thickness of the fringe portion and the joining structure is equal to a thickness of the parallel frame portion.

15. A display device, the display device having a displaying direction and comprising:
   a plate member, the overall plate member extending parallel to a reference plane, the plate member having a fringe portion and a joining structure formed on the fringe portion, the fringe portion having an edge, a first surface, and a second surface opposite to the first surface, the joining structure comprising an opening structure and a raised portion, the opening structure passing through the first surface and the second surface, an orthographic projection of the raised portion on the first surface being located within an orthographic projection of the joining structure on the first surface, the reference plane being perpendicular to the displaying direction, the first surface and the second surface being parallel to the reference plane;
   an outer frame, the outer frame having a parallel frame portion and a non-parallel frame portion extending from the parallel frame portion, the parallel frame portion and the fringe portion being joined together so that the outer frame and the plate member form an accommodating space, the parallel frame portion being parallel the fringe portion and being embedded into the joining structure, the non-parallel frame portion being non-parallel to the fringe portion, the parallel frame portion being coplanar with the first surface or the second surface; and
   a display panel, accommodated in the accommodating space.

16. The display device according to claim 15, wherein the non-parallel frame portion extends perpendicular to the fringe portion.

17. The display device according to claim 15, wherein the first surface is exposed in the accommodating space, and the parallel frame portion is coplanar with the first surface.

18. The display device according to claim 15, wherein the raised portion is located at an end or side of the opening structure.

19. The display device according to claim 15, wherein a projection of the raised portion in a direction perpendicular to the first surface or the second surface has a polygonal profile.

20. The display device according to claim 15, wherein the first surface is exposed in the accommodating space, the parallel frame portion is coplanar with the first surface, and the raised portion protrudes from the second surface.

21. The display device according to claim 15, wherein the joining structure has a through hole, the through hole passes through the first surface and the second surface, and the raised portion is located at a hole edge of the through hole.

22. The display device according to claim 15, wherein the outer frame is an n-shaped structure, the plate member forms an accommodating slot at an opening of the n-shaped structure, the display panel comprises a liquid-crystal panel and a backlight module, and the backlight module comprises a light bar, disposed in the accommodating slot.

23. The display device according to claim 15, further comprising an outer casing, connected to the outer frame and covering the plate member, wherein the outer casing and the display panel are located at two opposite sides of the plate member.

24. The display device according to claim 15, wherein the parallel frame portion is coplanar with a top surface of the raised portion.

25. The display device according to claim 15, wherein the parallel frame portion covers a top surface of the raised portion.

26. The display device according to claim 15, wherein an entire thickness of the fringe portion and the joining structure is equal to a thickness of the parallel frame portion.

* * * * *